June 13, 1939.   W. SIX   2,162,274

TRANSFORMER DEVICE

Filed Jan. 30, 1935

INVENTOR
WILLEM SIX
BY
ATTORNEY

Patented June 13, 1939

2,162,274

UNITED STATES PATENT OFFICE 2,162,274

TRANSFORMER DEVICE

Willem Six, Eindhoven, Netherlands, assignor to Radio Corporation of America, a corporation of Delaware Application January 30, 1935, Serial No. 4,000
In Germany March 14, 1934

3 Claims. (Cl. 178—44)

The invention relates to a low frequency transformer possessed of the property that alternating currents the frequency of which is beyond a given limiting value are heavily damped.

It is accordingly an object of this invention to provide a transformer having three windings at least one of the secondary windings being shunted by a condenser.

A still further object of the invention is to provide a band pass filter having a sharp cut-off at the high frequency end of the band to be amplified. Other objects will become apparent to those skilled in the art as the description thereof proceeds.

According to the invention the desired results are obtained by a transformer which comprises a tertiary winding in addition to a primary and a secondary winding, the tertiary being closed through a condenser which is proportioned so as to constitute with the tertiary leakage inductance a resonance circuit which is tuned to a frequency that is higher than the leakage resonance frequency of the secondary.

Figure 1:
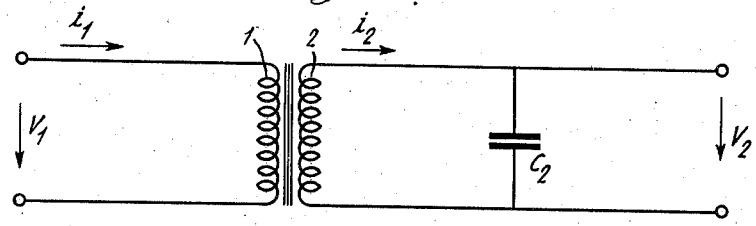
Figure 2:
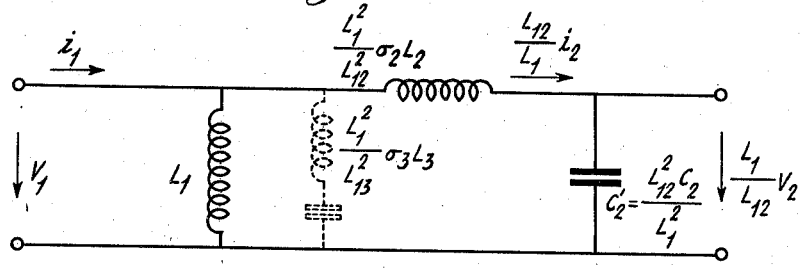
Figure 3:
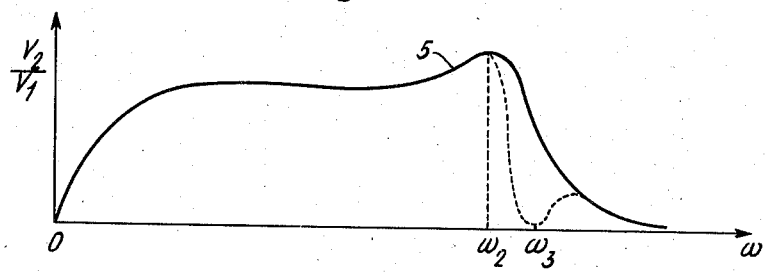
Figure 4:
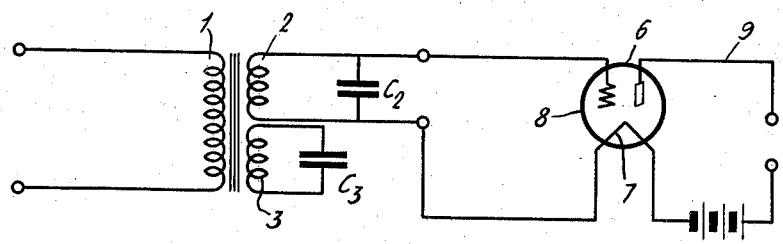

Figure 1 shows a transformer with a load capacity connected in parallel with the secondary winding; Fig. 2 is an equivalent circuit diagram of the transformer of Figure 1; Figure 3 is a characteristic curve of a transformer similar to that shown in Fig. 1; and Figure 4 is a coupling circuit embodying the present invention.

In order that the invention may be clearly understood and readily carried into effect, one embodiment thereof will now be described more fully by way of example, with reference to the accompanying drawing.

Figure 1 shows an iron core transformer having a primary 1 and a secondary 2 and a load capacity connected in parallel to the latter and formed for example by the natural capacity $C_2$ of the secondary. It is well known that if the ohmic resistances of the two coils are neglected and the primary and secondary inductances are in addition designated by $L_1$ and $L_2$ and the mutual inductance by $L_{12}$, the transformer shown in Fig. 1 may be replaced by the substitution diagram shown in Fig. 2.

It will be seen from Figure 2 that the leakage inductance $$\frac{L_1^2}{L_{12}^2}\sigma_2$$

$L_2$ comes into resonance with the capacity $$\frac{L_{12}^2}{L_1^2}C_2$$

connected in series thereto at a frequency which is determined by the ratio $$\omega_2^2=\frac{1}{\sigma_2 L_2 C_2}$$

in which $$\sigma_2=1-\frac{L_{12}^2}{L_1 L_2}$$

and $\sigma$ denoting the leakage coefficient.

The frequency characteristic curve of such a transformer is shown in Figure 3 and has, as follows from the foregoing, for the leakage resonance frequency $\omega_2$ a peak portion 5 the height of which also depends on the ohmic resistance of the secondary and also the internal resistance of the generator connected to the primary.

If thus, in accordance with my invention, a transformer is provided with two coils and an additional third coil 3 coupled to the primary as shown in Figure 4 is closed via a condenser $C_3$, the substitution diagram of Figure 2 also applies to it, the tertiary leakage inductance $$\frac{L_1^2}{L_{13}^2}\sigma_3 L_3$$

being connected, in parallel with the inductance $L_1$, in series with a capacity, as indicated by the inductance and capacity shown in dotted lines. $L_3$ designates therein the inductance of the tertiary winding 3, and $L_{13}$ the mutual inductance of the tertiary and the primary. The tertiary leakage inductance forms with the condenser $$\frac{L_{13}}{L_1^2}C_3$$

a series resonance circuit which at the frequency $$\omega_3^2=\frac{1}{\sigma_3 L_3 C_3}$$

$$\left(\text{in which } \sigma_3=1-\frac{L_{13}}{L_1 L_3}\right)$$

comes into resonance and constitutes for this frequency, the ohmic resistance of the tertiary being not taken into account, a short-circuit so that the transmission of any substantial amount of energy at this frequency from the primary to the secondary is no longer possible. Due proportioning of the tertiary inductance and of the condenser $C_3$ permits of the resonance frequency $\omega_3$ being made slightly higher than the leakage resonance frequency $\omega_2$ of the secondary. This case is shown in Figure 3 by the curve in dotted lines from which it is apparent that the frequency characteristic for frequencies higher than the frequency $\omega_2$ falls very steeply so that transmission of energy no longer occurs for these frequencies.

The transformer according to the invention may be used with advantage as an input transformer of apmlifiers intended to amplify a given frequency band only, as in the case, for example, of two-wire amplifiers for wire telephony. Such an amplifier is shown in Figure 4, the grid and cathode thereof being connected to the terminals of secondary winding 2.

Having described my invention, what I claim as novel and desire to secure by Letters Patent is:

1. A device for transmitting a broad band of audio frequencies comprising, a transformer having a primary and a secondary winding, a third winding inductively coupled to said primary winding and a condenser connected to said third winding the capacity of said condenser forming with the leakage inductance of said third winding a circuit having a resonant frequency which is higher than the leakage resonance frequency of the secondary winding.

2. An arrangement for amplifying a broad band of audio frequencies including an upper limiting frequency, comprising the combination of a transformer having a primary winding, a secondary winding and a tertiary winding, a space discharge tube having a cathode, a control grid and a plate, an input circuit connecting said cathode and control grid and including the series connection of said secondary winding, a condenser having its opposite sides directly connected to said grid and cathode, and a second condenser having its terminals connected to the ends of said third winding, said third winding being constructed so that its leakage inductance forms with said second condenser a circuit having a resonant frequency which is higher than the leakage resonance frequency of the secondary.

3. An arrangement for amplifying a broad band of audio frequencies including an upper limiting frequency comprising, the combination of an input transformer having a primary winding, a secondary winding and a tertiary winding, an electronic tube having a cathode, a control grid and a plate, an input circuit connecting said cathode and control grid and including the series connection of the secondary winding, a condenser having its opposite sides directly connected to the grid and cathode, and a second condenser having its terminals connected to the ends of the third winding, said third winding being constructed so that its leakage inductance forms with the second condenser a circuit having a resonant frequency which is near the upper end of the band of frequencies to be amplified and slightly higher than the leakage resonance frequency of the secondary winding.

WILLEM SIX.